(12) United States Patent
Patel et al.

(10) Patent No.: US 7,052,730 B2
(45) Date of Patent: *May 30, 2006

(54) DOCUMENT SECURITY PROCESSES

(75) Inventors: Raj D. Patel, Oakville (CA); Michael A. Hopper, Toronto (CA); H. Bruce Goodbrand, Hamilton (CA)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/225,408

(22) Filed: Aug. 20, 2002

(65) Prior Publication Data

US 2004/0037947 A1    Feb. 26, 2004

(51) Int. Cl.
*B41M 3/14* (2006.01)
*B05D 5/06* (2006.01)
*B05D 1/36* (2006.01)
*B05D 1/38* (2006.01)

(52) U.S. Cl. .................. 427/7; 427/157; 427/160; 427/265; 427/288

(58) Field of Classification Search ........... 427/7, 427/157, 160, 256, 258, 261, 265, 288; 428/916, 428/29, 199; 283/72, 92, 114, 902; 106/31.13, 106/31.6, 31.9
See application file for complete search history.

(56) References Cited

U.S. PATENT DOCUMENTS

| | | | |
|---|---|---|---|
| 3,674,736 A | | 7/1972 | Lerman et al. ........... 260/41 R |
| 4,598,118 A | * | 7/1986 | Hansen et al. ............ 524/517 |
| 4,796,921 A | | 1/1989 | Neiman ..................... 283/91 |
| 5,208,630 A | | 5/1993 | Goodbrand et al. ....... 355/201 |
| 5,225,900 A | * | 7/1993 | Wright ...................... 358/501 |
| 5,289,547 A | * | 2/1994 | Ligas et al. ................. 283/72 |
| 5,290,654 A | | 3/1994 | Sacripante et al. ........ 430/137 |
| 5,344,192 A | | 9/1994 | Phillips ..................... 283/91 |
| 5,554,480 A | | 9/1996 | Patel et al. ............... 430/137 |
| 5,586,787 A | * | 12/1996 | Brown et al. .............. 283/67 |
| 5,695,220 A | | 12/1997 | Phillips ..................... 283/91 |
| 5,826,916 A | | 10/1998 | Phillips ..................... 283/91 |
| 5,886,128 A | * | 3/1999 | West et al. ............... 528/158.5 |
| 6,673,500 B1 | * | 1/2004 | Patel et al. ............... 430/108.2 |

FOREIGN PATENT DOCUMENTS

| | | | |
|---|---|---|---|
| EP | 2001-096887 A | * | 4/2001 |
| JP | 2001-0968886 A | * | 4/2001 |

OTHER PUBLICATIONS

Definition of "titanium dioxide" from Hawley's Condensed Chemical Dictionary, 12th Ed., © 1993 by Van Nostrand Reinhold, p. 1153.*

* cited by examiner

*Primary Examiner*—Timothy Meeks
*Assistant Examiner*—William Phillip Fletcher, III
(74) *Attorney, Agent, or Firm*—Eugene O. Palazzo; Fay, Sharpe, Fagan, Minnich & McKee, LLP

(57) ABSTRACT

A process for generating on a substrate, such as a document, a security mark comprised of a glossy ink containing a colorant.

3 Claims, No Drawings

DOCUMENT SECURITY PROCESSES

CROSS REFERENCE

There is illustrated in copending U.S. Ser. No. 10/225,411, now U.S. Pat. No. 6,665.017; entitled Document Security Processes, filed concurrently herewith, the disclosure of which is totally incorporated herein by reference, a process comprising applying a toner security mark on a document generated by xerographic means, and which mark possesses white glossy characteristics and wherein said toner is comprised of a polymer and a colorant, and which mark possesses white glossy characteristics and wherein the toner is comprised of a polymer and a colorant; and in U.S. Ser. No. 10/225,214, filed on Aug. 20, 2002 entitled Document Security Processes, filed concurrently herewith, the disclosure of which is totally incorporated herein by reference, a process comprising applying a toner security mark on a document generated by xerographic means and which mark possesses white glossy characteristics, and wherein said toner is comprised of a waterborne polymer and a colorant.

BACKGROUND

The present invention is directed to lithographic processes, and more specifically, to processes wherein a component of, for example, a white glossy toner mark, wherein glossy refers, for example, to a gloss value of about 75 to about 140 gardiner gloss unit (GGU), and more specifically, of from about 80 to about 130 GGU as measured by a gloss meter at an angle of, for example, about 75 degrees, when placed on a substrate, such as paper, is visibly detectable by, for example, the eye when viewed at any angle of, for example, about 10 to about 85 degrees, and more specifically, from about 35 to about 65 degrees. The viewing angle refers, for example, to the angle as measured perpendicular to the mark or marks on the substrate. Moreover, the substrate can contain a second toner mark which is not visible to the eye, and which mark is detectable, that is when, for example, this mark is radiated with UV light it becomes visible to the eye. Documents containing such marks when reproduced xerographically or by ink jet devices results in the absence of the glossy marks or the marks appear as a dull gray mark indicating a counterfeit. In embodiments, the process of the present invention comprises the lithographic generation of documents, such as tickets like tickets to sports activities, coupons, classified papers, currency, and the like, by the formation of a security mark, water mark, indicia thereon, and which mark when dried possesses a white shiny or glossy surface wherein shiny or glossy refers, for example, to possessing a highly reflective surface wherein most, for example about 75 to about 95 percent, of the incident light is reflected from the surface where the mark is glossy compared to the remainder of the nonglossing portion of the document, and wherein duplication or counterfeiting thereof by, for example, xerography, ink jet printing, and the like will result in the absence of the security mark or the security mark may appear as a dull black/grey mark thereby indicating that the document is not authentic and is a forgery or a fake. Moreover, in embodiments a plurality of security marks may be included in the document wherein plurality refers to at least two, and can be from about 2 to about 4. Accordingly, the use of costly sophisticated instruments to authenticate the mark can be avoided, since the security mark generated with a number of the processes disclosed herein can be detected visually.

REFERENCES

Illustrated in U.S. Pat. No. 5,208,630, the disclosure of which is totally incorporated herein by reference, are processes for the authentication of documents, such as tickets, credit cards, and the like, by generating these documents with a toner containing an infrared light absorbing component, which compositions are detectable when exposed to radiation outside the visible wavelength range, and more specifically, a wavelength of from between about 650 to 950 nanometers.

Illustrated in U.S. Pat. No. 5,225,900, the disclosure of which is totally incorporated herein by reference, is a process for controlling a reproduction system comprising scanning an image to detect at least one taggant in at least one marking material forming the image; issuing instructions to a reproduction system, and which instructions cause the reproduction system proceed in a certain manner.

Further, of interest is U.S. Pat. No. 5,554,480, which discloses, for example, a toner containing a UV pigment, and U.S. Pat. Nos. 5,344,192; 5,826,916; 5,695,220 and 4,796,921, the disclosures of which are totally incorporated herein by reference.

SUMMARY

It is a feature of the present invention to provide processes for the generation of images on a number of documents.

Further, it is another feature of the present invention to provide permanent security marks on documents.

Also, it is yet another feature of the present invention to provide a visible mark on security documents, such as tickets, coupons, identification badges, passes, negotiable securities, and the like, and which mark or marks are formed by an ink composition comprised of a white pigment and a polymer, and which ink dries in about 8 to about 15 seconds.

Additionally, it is another feature of the present invention to provide a lithographic process that prevents the duplication of documents, including security documents, like tickets, coupons or credit cards.

Another feature of the present invention is to provide a lithographic process for determining the authenticity of documents, such as tickets, coupons, credit cards, security badges, and the like.

Furthermore, features illustrated herein include providing security marks comprised of white inks; providing covert document authentication processes wherein selected areas, or words of documents can be distinguished from the remainder of the document readily by the eye and also wherein a second mark is detectable by, for example, illuminating with a UV device, thereby enabling security or special coding of the document; the pigments or the dyes selected for the second mark in embodiments are those that fluoresce under ultraviolet light, that is, for example, from about 200 nanometers to about 400 nanometers; providing lithographic inks for placing coded information on a document, and which inks can be selected for multicolor lithographic imaging processes; and providing a process of preparing a white glossy ink mark which is clearly visible to the eye in contrast to a paper substrate despite the whiteness of the paper and the gloss of the paper, wherein the mark when viewed is clearly visible, irrespective of the light source.

Aspects of the present invention relate to a process comprising generating on a substrate a security mark comprised of a glossy ink containing a colorant; a process comprising providing a security mark on a document generated by lithography and which mark is comprised of a glossy ink containing a polymer and a white colorant; a process wherein there is further provided a second mark comprised of a colorant embedded in a polymer; a process wherein the polymer is a film forming polymer; a process wherein the colorant is a titanium oxide; a process wherein the colorant is a 4,4'-bis(styryl)biphenyl; a process wherein the colorant is a pigment of titanium oxide present in an amount from about 10 to about 40 weight percent by weight of the dry ink mark; a process wherein the pigment of titanium oxide is present in an amount of from about 15 to about 35 weight percent by weight; a process wherein the colorant is a pigment of 4,4'-bis(styryl)biphenyl present in an amount of from about 1 to about 10 weight percent by weight; a process wherein the colorant is a pigment of 4,4'-bis(styryl)biphenyl present in an amount of from about 2 to about 8 weight percent by weight; a process wherein the document is a sporting ticket, an airline ticket, currency, a coupon, or classified paper; a process wherein the document contains colors of cyan, magenta, yellow and black; a process wherein the polymer is selected from the group consisting of butylacrylate carboxylic acid, butylacrylate methylmethacrylate carboxylic acid, styrene butylacrylate carboxylic acid and styrene methylacrylate carboxylic acid; a process wherein the carboxylic acid is selected from the group consisting of acrylic acid, itaconic acid, methacrylic acid and beta carboxy ethyl acrylate; a process wherein the polymer is butylacrylate methacrylic acid; a process wherein the polymer is poly(butylacrylate acrylic acid), poly(butylacrylate methacrylic acid), poly(butylacrylate itaconic acid), poly(butylacrylate beta carboxy ethyl acrylate), poly (butylacrylate methylmethacrylate acrylic acid), poly(butylacrylate methylmethacrylate methacrylic acid), poly(butylacrylate methylmethacrylate itaconic acid), poly (butylacrylate-methylmethacrylate beta carboxy ethyl acrylate), poly(methylmethacrylate acrylic acid), poly(methylmethacrylate methacrylic acid), poly(methylmethacrylate itaconic acid), poly(methylmethacrylate beta carboxy ethyl acrylate), poly(butylacrylate butylmethacrylate acrylic acid), poly(butylacrylate butylmethacrylate methacrylic acid), poly(butylacrylate butylmethacrylate itaconic acid), poly(butylacrylate butylmethacrylate beta carboxy ethyl acrylate), poly(styrene butylacrylate acrylic acid), poly(styrene butylacrylate methacrylic acid), poly(styrene butylacrylate itaconic acid), or poly(styrene butylacrylate beta carboxy ethyl acrylate); a process wherein the polymer is present in an amount of from about 60 to about 85 percent by weight of the dry ink mark, and the colorant is present in an amount of from about 40 to about 15 percent by weight of the dry ink mark; a process wherein the polymer is present in an amount of about 90 to about 98 percent by weight; a process wherein the mark is rendered visible when illuminated with a UV source with a wavelength of from about 200 to about 400 nanometers; a process wherein the second mark contains a pigment selected from the consisting of 4,4'-bis (styryl)biphenyl, 2-(4-phenylstilben-4-yl)-6-butylbenzoxazole, beta-methylumbelliferone, 4-methyl-7-dimethylaminocoumarin, 4-methyl-7-aminocoumarin, N-methyl-4-methoxy-1,8-naphthalimide, 9,10-bis(phenethynyl) anthracene, and 5,12-bis(phenethynyl)naphthacene; a process wherein for the first mark the pigment is 4,4'-bis(styryl) biphenyl; a process wherein the colorant is a pigment selected from the group comprised of titanium dioxide, aluminum oxide, zirconium oxide and zinc oxide; a process wherein the security mark is printed on a white background; a process wherein the first mark when printed on paper is visible, and there is further included a second mark substantially invisible to the eye; a process wherein the glossy mark is visible at angles of about 15 to about 85 degrees from the perpendicular; a process wherein the visible glossy security mark is located at various positions on a document; a process further including a second mark, and wherein the second mark is located at various positions on the document; a process wherein the security mark is present on the document in from about 1 to about 5 positions; a process wherein a second security mark is contained on the document, and which security mark contains a UV sensitive pigment; a process wherein the pigment contains a UV fluorescent component; a process for the authentication of documents comprising generating a security mark on a document, and which mark is comprised of a glossy ink containing a polymer and a pigment; a process for avoiding the copying of a document by providing a security mark on the document, and which mark is comprised of a glossy ink containing a pigment; lithographic ink processes for the preparation of a security mark, which mark can be, for example, comprised of a white glossy mark and is clearly distinguished or visible from the paper substrate, and which glossy mark is apparent at, for example, from about 10 through about 85 degrees viewing angles, that is for example, the angle as measured perpendicular of the mark on the paper, thus the white glossy mark can be viewed between the angles of about 35 to about 65 degrees, and more specifically, from about 40 to about 60 degrees of the light source; a process wherein the amount of the white pigment selected is equal to or less than about 40 percent by weight, for example from about 15 to about 35 percent by weight of the ink or toner formulation enabling, for example, a larger range of viewing angles when compared to pigment loadings in excess of 40 percent, for example 40 to about 50 percent, which amounts can result in a reduction of the viewing angle by about 50 percent; and furthermore, when the pigment loading is increased beyond, for example, greater then 50 percent the viewing angle for the mark is further decreased to a point that the mark begins to match the paper substrate and become a hidden mark, reference, for example, U.S. Pat. Nos. 5,344,192; 5,695,220 and 5826,916, the disclosures of which are totally incorporated herein by reference; a process utilizing a lithographic ink containing a white visible security mark, which mark contains polymers of styrene acrylic with a molecular weight ($M_w$) of about 1,000 to about 200,000, and more specifically, from about 2,000 to about 100,000, and wherein the acid number for the polymer is from about 25 to about 500, and more specifically, from about 30 to about 300, and wherein the white pigment is a titanium dioxide pigment present in an amount of about 10 to about 40 percent, and more specifically, about 15 to about 35 weight percent by weight of the ink formulation providing a visible white security mark on a document, and wherein the reproduced copies thereof lack the presence of the white glossy security mark; providing on paper and the like a secondary security mark that fluoresces when illuminated with a UV light source, which mark when placed on a document, such as a coupon, in addition to the visible primary white glossy mark provides a security mark for automatic grocery checkout, wherein the coupon is also authenticated by a bar code; and reproduced or duplicated copies will result in lack of both marks.

Embodiments illustrated herein relate to a security mark process utilizing a varnish which generally contains a high number of acid groups, for example from about 25 to about 500, thereby allowing the polymer to be dispersed into submicron particles in water in the presence of a base; these dispersions generally possess a high polymer concentration, for example about 40 to about 60 percent by weight, resulting in viscosity a which is, for example, about 150 to about 4,000 centipoise; and which polymeric or resin dispersions are then used to prepare ink formulations; a process of preparing a white ink dispersion where the dispersion comprises a white pigment, such as titanium dioxide ($TiO_2$) dispersed in a resin dispersion comprising resin particles, water and optionally a surfactant, which resin is, for example, a film forming or a fast drying resin; providing a dispersion comprised of about 20 to about 40 weight percent of titanium dioxide pigment, about 15 to about 30 weight percent of polymer resin, and about 65 to about 30 weight percent water, resulting in a printing ink to which is added about 5 pph of silica as a flow aid; a process of generating a dispersion of a second white ink using a pigment, such as DAYGLO INVISIBLE BLUE™, which is dispersed in a resin dispersion comprising resin particles, water and a surfactant, and wherein the second white ink dispersion comprises about 5 to about 10 weight percent of a fluorescent component, such as DAYGLO INVISIBLE BLUE™ pigment, about 25 to about 40 weight percent of polymer resin, and about 70 to about 50 weight percent water, resulting in a printing ink to which optionally is added about 5 to about 7 pph of silica as a flow aid; a process generating security marks with inks possessing a viscosity of about 40 to about 80 centipoise and a pH of about 7 to about 9; a process wherein there are selected waterborne latex dispersions where the latex dispersion is prepared by semibatch polymerization using acrylic or styrene acrylic monomers; and wherein the latex particle size distribution can be monomodal or bimodal; the waterborne polymers are alkali soluble and wherein the polymer particles disintegrate and the molecular chains dissolve in the water phase, resulting in an alkali solution or a varnish, which acts as a film former.

The security mark, which can appear as a white glossy reflecting surface, and which mark can be located on various areas of the document and be of various sizes of, for example, from about 0.5 centimeter to about 5 centimeters in width, and wherein in embodiments a bar code can be placed thereover, and further optionally the mark can be placed in any format on any part of the document, and which mark is visible to the naked eye when viewed at any angle. The mark can be generated with a number of various suitable components, and more specifically, with an ink comprised of a polymer, such as known rapid drying polymers selected for lithography, and a colorant, preferably a white colorant, or pigment of, for example, titanium dioxide, and which security mark cannot be effectively reproduced. The ink for formation of the mark can be prepared by a process in which a white pigment is ground by either attrition or media mills in a polymer matrix suitable for lithography, and wherein when such mark is placed on paper results in a security mark which cannot be readily duplicated or reproduced. The wet ink formulation in embodiments comprises, for example, about 15 to about 40 percent of a fast drying polymer that is, for example, a polymer which dries in about 8 to about 15 seconds, about 6 to about 18 percent of a pigment, such as a titanium dioxide pigment, about 79 to about 42 percent water by weight of the wet ink formulation and about 5 parts per hundred (pph) of flow aids, such as silica, and wherein the pigment diameter size can be, for example, from about 0.05 to about 0.7 micron, and which pigment is suspended in an aqueous phase in the presence of a dispersant. The aforementioned ink can then be applied lithographically to the document to be protected wherein the ink mark when dry comprises, for example, from about 15 to about 40 percent of a pigment or colorant and, for example, about 85 to about 60 percent of polymer or a varnish, wherein varnish refers to a film forming component subsequent to drying.

The security mark can be applied prior to generating the final document, during the preparation of the document, or subsequent to the preparation of the document. Optionally, in addition to the security mark illustrated herein, the document, such as a check, a coupon or other security document, may contain a second dissimilar mark than the first mark, or first marks which when radiated by a light source, such as a UV light source, is rendered visible to the eye. The aforementioned second mark can be generated with, for example, an ink that contains an emitting component or a component that fluoresces when illuminated with, for example, a UV light source at, for example, about 400 to about 700 nanometers of the visible spectral region, and wherein such component is, for example, 4,4'-bis(styryl) biphenyl, 2-(4-phenylstilben-4-yl)-6-butylbenzoxazole, beta-methylumbelliferone, 4-methyl-7-dimethylaminocoumarin, 4-methyl-7-aminocoumarin, N-methyl-4-methoxy-1, 8-naphthalimide, 9,10-bis(phenethynyl)anthracene, 5,12-bis (phenethynyl)naphthacene, or DAYGLO INVISIBLE BLUE™ A-594-5. The aforementioned ink usually contains the light emitter or a fluorescent component that is dissolved or finely dispersed in the polymer resin or dispersed in a varnish. An example of an ink that may be selected is comprised of a fast drying polymer resin in an amount of, for example, about 15 to about 40 percent by weight of wet ink and preferably about 17 to about 38 percent by weight of wet ink, and a pigment like titanium dioxide in an amount of about 6 to about 18 weight percent by weight of the wet ink, and preferably from about 8 to about 15 percent by weight of wet ink with the remainder of the ink being water. The second ink for the generation of an additional security mark comprises a rapid drying polymer resin in the form of a waterborne latex selected in an amount of, for example, about 30 to about 50 percent by weight of the wet ink formulation, and a fluorescent component present in an amount of about 1 to about 5 percent by weight of the wet ink formulation and about 69 to about 45 percent water. Flow aids in suitable effective amounts, such as silica, can be added to both ink formulations. These inks when dried result in a composition comprised of a fluorescent pigment of, for example, from about 2 to about 10 percent and a polymer resin in an amount, for example, of about 98 to about 90 percent by weight of dry ink. Optionally known printing ink viscosity modifiers can be used to prepare the ink. The inks, such as gravure inks, can, for example, be prepared wherein solvents and viscosity modifiers are added as part of the formulation to speed up the drying time. A number of known lithographic printing presses can be selected for the generation of the security mark or marks.

Ink polymer examples include known polymers selected, for example, from the group consisting of acrylic resins or styrene acrylic resins such as poly(butylacrylate acrylic acid), poly(butylacrylate methacrylic acid), poly(butylacrylate itaconic acid), poly(butylacrylate beta carboxy ethyl acrylate), poly(butylacrylate methylmethacrylate acrylic acid), poly(butylacrylate methylmethacrylate methacrylic acid), poly(butylacrylate methylmethacrylate itaconic acid), poly(butylacrylate methylmethacrylate beta carboxy ethyl acrylate), poly(methylmethacrylate acrylic acid), poly(methylmethacrylate methacrylic acid), poly(methylmethacrylate itaconic acid), poly(methylmethacrylate beta carboxy ethyl acrylate), poly(butylacrylate butylmethacrylate acrylic acid), poly(butylacrylate butylmethacrylate methacrylic acid), poly(butylacrylate butylmethacrylate itaconic acid), poly(butylacrylate butylmethacrylate beta carboxy ethyl acrylate), poly(styrene butylacrylate acrylic acid), poly(styrene butylacrylate methacrylic acid), poly(styrene butylacrylate itaconic acid), and poly(styrene butylacrylate beta carboxy ethyl acrylate).

The polymer particles selected, which generally in embodiments include acrylate carboxylic acids, styrene acrylates carboxylic acids, and the like are present in various effective amounts, such as from about 10 weight percent to about 40 weight, and more specifically, from about 15 to about 35 percent of the wet ink formulation. Other effective amounts of resin can be selected. Also, the polymer selected for the process of the present invention can be prepared by, for example, emulsion polymerization techniques, including semicontinuous emulsion polymerization methods, and the monomers utilized in such processes can be selected from, for example, styrene, acrylates, methacrylates, acid or basic olefinic monomers such as acrylic acid, methacrylic acid, itaconic acid, acrylamide, methacrylamide, and the like. The acid groups in the monomer, or polymer resin can be present in various amounts of, for example, from about 5 to about 20 percent by weight of the polymer resin, and more specifically, about 7 to about 15 percent by weight of resin. Chain transfer agents, such as dodecanethiol or carbon tetrabromide, can also be selected when preparing resin particles by emulsion polymerization. The latex particle produced is generally in the size range of about 0.05 to about 0.5 micron in diameter. Other processes of obtaining the polymer particles of, for example, from about 0.01 micron to about 1 micron can be selected from polymer microsuspension process, such as those illustrated in U.S. Pat. No. 3,674,736, the disclosure of which is totally incorporated herein by reference, polymer solution microsuspension process, such as disclosed in U.S. Pat. No. 5,290,654, the disclosure of which is totally incorporated herein by reference, mechanical grinding process, or other known processes.

Examples of anionic surfactants selected for the latex preparation include, for example, sodium dodecylsulfate (SDS), sodium dodecylbenzene sulfonate, sodium dodecyinaphthalenesulfate, dialkyl benzenealkyl, sulfates and sulfonates, abitic acid, available from Aldrich, NEOGEN RK™, NEOGEN SC™ from Kao and the like. An effective concentration of the anionic surfactant generally employed is, for example, from about 0.01 to about 10 percent by weight, and preferably from about 0.1 to about 5 percent by weight of monomers used to prepare the latex polymer resin.

Examples of nonionic surfactants that may be, for example, included in the resin latex dispersion include, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. A suitable concentration or amount of the nonionic surfactant is, for example, from about 0.01 to about 10 percent by weight, and preferably from about 0.1 to about 5 percent by weight of monomers used to prepare the latex polymer resin.

The solids content of the latex dispersion, which in embodiments comprises submicron resin particle suspended in water, is not particularly limited. The solids content may be, for example, from about 10 to about 40 percent. With regard to the pigments, such as titanium dioxide, in some instances they are available in the wet cake or concentrated form containing water, and can be easily dispersed utilizing a homogenizer, or simply by stirring, ball milling, attrition or media milling. In other instances, pigments are available only in a dry form whereby a dispersion in water is effected by microfluidizing using, for example, a M-110 microfluidizer or an ultimizer and passing the pigment dispersion from about 1 to about 10 times through a chamber by sonication, such as using a Branson 700 sonicator, with a homogenizer, ball milling, attrition, or media milling with the optional addition of dispersing agents such as the aforementioned ionic or nonionic surfactants.

In embodiments, the white colorant particles are present in the ink composition in an amount of from about 10 percent by weight to about 40 percent by weight, and more specifically, about 20 to about 30 percent calculated on the weight of the ink, and which white colorant can be titanium dioxide, aluminum oxide, zirconium oxide, zinc oxide, and the like.

The UV fluorescent component for the second mark can, for example, be selected from the group of 4,4'-bis(styryl) biphenyl, 2-(4-phenylstilben-4-yl)-6-butylbenzoxazole, beta-methylumbelliferone, 4-methyl-7-dimethylaminocoumarin, 4-methyl-7-aminocoumarin, N-methyl-4-methoxy-1,8-naphthalimide, 9,10-bis(phenethynyl) anthracene, 5,12-bis(phenethynyl) naphthacene, or DAYGLO INVISIBLE BLUE™ A-594-5, with DAYGLO INVISIBLE BLUE™ being preferred in embodiments, and which fluorescent component can be present in the amount of from about 2 to about 10 weight percent by weight of the dry ink mark. The second security ink mark comprises, for example, about 5 to about 10 weight percent of a fluorescent component, such as DAYGLO INVISIBLE BLUE™ pigment, about 25 to about 40 weight percent of polymer resin, and about 70 to about 50 weight percent water.

More specifically, with regard to two sided coupons wherein the first side usually contains a full color image of the product being offered or optionally a single color, which is printed on the paper followed by printing on the reverse of the paper the conditions of coupon redemption, a barcode all in black ink, together with two white security ink marks. The security ink marks can be deposited in various combinations including placing a barcode on top of the white glossy mark with the UV fluorescing mark being placed next to the white glossy mark containing the bar code, or placing the barcode on top of the UV emitter mark with the white glossy mark placed next to the UV fluorescing mark containing the bar code. The security marks can optionally be placed in independent location of each other and in any area on the document, such as paper. Regarding a single sided coupon, there can be selected a printing machine with three ink stations, one containing a black ink for writing text messages and placing the barcode, a second developer housing containing a white glossy ink, and a third containing a UV emitter. For color, a fourth ink station can be utilized. The barcode is usually placed on a white background for maximum contrast in order for the scanner to read the barcode. The security marks are hence placed next to the barcode or below the barcode. In all cases, the coupons are usually full of color on one side while the reverse side is about 95 to about 99 percent white where the text information, such as addresses, or P.O. box, etc., including the barcode, are all printed in black.

The following Examples are being provided.

EXAMPLE I

A latex emulsion (i) comprised of polymer particles generated by the emulsion polymerization of butyl acrylate and methacrylic acid was prepared as follows. An initiator solution containing 41 kilograms of deionized water and 49 grams of ammonium persulfate was prepared by mixing these components for 10 minutes in a stainless steel holding tank. The holding tank was then purged with nitrogen for 5 minutes before transferring the resulting mixture into a reactor. The reactor was then continuously purged with nitrogen while the contents were stirred at 100 RPM; the reactor was then heated to 70° C. to form Solution A.

Separately, 490 grams of ammonium persulfate initiator were dissolved in 45 kilograms of deionized water, to which were added 1,300 grams of sodium dodecylsulfate (SDS) and 270 grams of sodium bicarbonate resulting in Solution B. Also, separately a monomer emulsion was prepared in the following manner. 102.3 Kilograms of butyl acrylate, 11 kilograms of methacrylic acid, and 500 grams of n-dodecylmercaptane were mixed, followed by adding this mixture to the above Solution B and mixing for about 10 minutes to form a feed. The monomer feed was then fed into the preheated reactor containing Solution A over a period of 40 minutes.

Once all of the above monomer emulsion was charged into the main reactor, the temperature was maintained at 70° C. for an additional 3 hours to complete the reaction. The reactor contents were then cooled down to about 40° C. and an aqueous solution containing 120 grams of ascorbic acid, 120 grams of tertiary butylhydroperoxide and 4,390 grams of water were added as a post reaction treatment and the mixture resulting was allowed to mix for a period of 30 minutes. The contents of the reactor were then cooled down to room temperature, about 25° C., and the pH was adjusted to 8 with the addition of ammonium hydroxide resulting in the polymer being alkali-soluble and providing a latex with a resin particle size diameter of 250 nanometers, and a particle size distribution of 1.25. The resulting resin particles were comprised of polybutylacrylate methacrylic acid in the ratio of 90.3:9.7. The resin had a weight average molecular weight of 602,500, as measured by a Gel Permeation Chromatograph, and a Tg of 20° C. as measured by a Differential Scanning Calorimeter. The latex solid loading was 53 percent by weight of the latex. The latex comprised 56 percent resin particles of polybutylacrylate methacrylic acid in the ratio of 90.3:9.7, and 44 weight percent water.

Preparation of a Titanium Dioxide ($TiO_2$) Dispersion:

134 Grams of titanium dioxide pigment were placed in 66 grams of water to which 2 pph of a nonionic surfactant of polyoxyethylene nonylphenyl ether were added. The mixture was then ground using a ball mill for a period of 0.5 hour resulting in a dispersion of 66 percent $TiO_2$, and 34 percent water.

Preparation of a UV Fluorescence Dispersion:

18 Grams of DAYGLO INVISIBLE BLUE™ pigment were placed in 182 grams of water to which 1 pph (parts per hundred) of the nonionic surfactant polyoxyethylene nonylphenyl ether was added. The mixture was then ground using a ball mill for a period of 1 hour resulting in a dispersion of 9 percent (weight percent throughout) of the above blue UV fluorescent pigment in water.

EXAMPLE II

Preparation of White Ink ($TiO_2$):

330 Grams of the above latex containing 53 percent solids were added to 66 grams of the above $TiO_2$ dispersion containing 66 percent of $TiO_2$ pigment. To this were added 100 grams of water to let down or reduce the viscosity and 0.5 gram of dodecanol as an antiforming agent. The mixture was then milled for a period of 1.5 hours to provide a wet ink formulation comprising 35.3 percent polymer, 8.8 percent $TiO_2$ pigment and 55.9 percent water. When the ink was dry, the resulting ink comprised 80 percent polymeric resin and 20 percent $TiO_2$ pigment by weight.

EXAMPLE III

30 Percent $TiO_2$ Pigment:

330 Grams of the above latex containing 53 percent solids were added to 112 grams of the above prepared $TiO_2$ dispersion containing 66 percent $TiO_2$ pigment solid. To this were added 100 grams of water to decrease the viscosity and 0.5 gram of dodecanol was then added primarily as an antiforming agent. The resulting mixture was then milled for a period of 1.5 hours to provide a wet ink formulation comprising 32.3 percent polymer, 13.6 percent $TiO_2$ pigment and 55.1 percent water. An ink mark was printed on paper with the ink pepared by lithography, such as a Xerox Corporation digital machine, and where the mark was subjected to an air stream thereby drying the mark in about 10 seconds. The dry ink mark was comprised of 70 percent butyl acrylate methacrylic acid copolymer and 30 percent of $TiO_2$ pigment by weight.

EXAMPLE IV

A UV Fluorescent:

330 Grams of the above prepared latex emulsion were added to 100 grams of a UV fluorescent dispersion containing 9 grams of 4,4'-bis(styryl)biphenyl pigment and 91 grams of water, to which was added 0.5 gram of dodecanol as an antiforming agent. The mixture was milled for a period of 1.5 hours resulting in a wet ink formulation comprising 40.7 percent polymer, 2 percent fluorescent pigment and 57.3 percent water. This ink when printed in a similar manner as that of Example III resulted in a dry ink mark comprised of 95 percent butyl acrylate methacrylic acid copolymer and 5 weight percent of the above UV fluorescent pigment.

EXAMPLE V

Full Color Coupon with Security Marks on Paper:

A store redeemable coupon for a baby food product was printed on a Xerox Corporation lithographic machine. The coupon with a security mark was prepared in the following manner. A six ink station printing ink machine was employed and the last two stations contained the white security inks illustrated herein. The full color coupon was printed in the standard printing manner using commercial inks containing Flexverse pigments. The first white ink which contained 35.3 percent butylacrylate methacrylic acid copolymer, 8.8 percent $TiO_2$ pigment and 55.9 percent water was then printed across the already printed redeeming conditions with the letters "SECURE COUPON". The words "SECURE COUPON" were clearly visible over the black redemption conditions. A second white security ink mark containing 40.7 percent butylacrylate, methacrylic acid copolymer, 2 percent of the fluorescent component 4,4'-bis(styryl)biphenyl pigment and 57.3 percent water was then printed in the form of a circle of 1 centimeter in diameter next to the barcode contained on the above coupon. This white mark was invisible to the eye. The coupons now contained two security marks, one mark which was white and shinny/glossy mark where the gloss was 93 GGU as measured by a Gardiner glossmeter which glossy mark was visible from a distance of 1 foot and a second white mark which was invisible to the eye. The invisible mark was rendered visible to the eye when placed under a UV light.

This original coupon was then placed on a color copier, such as a Xerox Corporation DocuColor 12, and attempts to duplicate the coupon xerographically under various contrast conditions resulted in the absence of the white glossy mark or the mark appeared as a dull gray circle, indicating a fake coupon. The reproduced coupon when placed under a UV light possessed no UV circular mark, which was present on the original, indicating a fake.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A process for marking a coupon with two security marks and a barcode, comprising:
   providing a first security mark, wherein the first mark comprises a white glossy ink, the white glossy ink comprising a white colorant and a polymer, wherein the white colorant is present in an amount of from about 10 to about 40 percent by weight of the first mark;
   providing a second security mark, wherein the second mark comprises a second ink containing a UV fluorescent pigment and a polymer resin, wherein the UV fluorescent pigment is present in an amount of from about 2 to about 10 percent by weight of the second mark;
   providing a barcode in black ink;
   placing the first security mark on the coupon;
   placing the second security mark on the coupon next to the first security mark; and
   placing the barcode on top of the first or second security mark.

2. The process of claim 1 wherein the barcode is placed on top of the first security mark.

3. The process of claim 1 wherein the barcode is placed on top of the second security mark.

* * * * *